United States Patent [19]

Endo

[11] Patent Number: 5,797,820
[45] Date of Patent: Aug. 25, 1998

[54] SLAT BAND CHAIN AND SPROCKET

[75] Inventor: Shunichi Endo, Tokyo, Japan

[73] Assignee: Yamakyu Chain Co., Ltd., Tokyo, Japan

[21] Appl. No.: 967,191

[22] Filed: Oct. 29, 1997

Related U.S. Application Data

[63] Continuation of Ser. No. 532,423, Sep. 22, 1995, abandoned.

[51] Int. Cl.[6] .................. F16G 13/02; B65G 17/06
[52] U.S. Cl. .................. 474/230; 474/226; 474/228; 474/234; 198/853; 59/78
[58] Field of Search .................. 474/226, 227, 474/228, 230, 232, 233, 234; 198/853; 59/78

[56] References Cited

U.S. PATENT DOCUMENTS

| | | | |
|---|---|---|---|
| 2,660,292 | 11/1953 | Cheesman | 198/853 |
| 3,262,550 | 7/1966 | Kampfer | 198/852 |
| 4,078,445 | 3/1978 | Kiser, Jr. | 74/243 R |
| 4,080,842 | 3/1978 | Lapeyre et al. | 474/228 |
| 4,586,914 | 5/1986 | Nagano | 474/160 |
| 5,026,329 | 6/1991 | Diekevers | 474/162 |
| 5,461,852 | 10/1995 | Nagamatsu | 59/84 |
| 5,690,210 | 11/1997 | Layne | 198/853 |

FOREIGN PATENT DOCUMENTS

| | | | |
|---|---|---|---|
| 3400721 | 7/1984 | Germany | 198/853 |
| 4-138012 | 12/1992 | Japan . | |
| 7-11043 | 3/1995 | Japan . | |
| 2531379 | 1/1997 | Japan . | |

*Primary Examiner*—Tamara L. Graysay
*Assistant Examiner*—Gary S. Hartmann
*Attorney, Agent, or Firm*—Andrus, Sceales, Starke & Sawall

[57] ABSTRACT

The present invention provides a slat band chain for both straight and curved lines and a sprocket made of synthetic resin which the chain can engage with every other tooth of the sprocket. At least three reinforcement ribs 24a–24c connecting the front curled portions 14 with the rear curled portions 16 are installed. The width B, and the length C, of the rear curled portions in the feeding direction are set to the intermediate value of those conventional slat band chains for straight and curved lines.

5 Claims, 7 Drawing Sheets

5,797,820

1

SLAT BAND CHAIN AND SPROCKET

This is a continuation of application Ser. No. 08/532,423, filed Sep. 22, 1995, now abandoned.

BACKGROUND OF THE INVENTION

1. Field of the invention

The invention relates to a slat band chain and sprocket and more particularly to a slat band chain which can be applied to both straight and curved lines and a sprocket which can be engaged with such a slat band chain.

2. Description of the Prior Art

The present applicant has proposed an improved a slat band chain of new configuration front that shown in FIG. 5 (Published Unexamined Utility Model Application No. 4-138012).

As shown in FIG. 5, the slat band chain link 100 comprises the top plate 102 on which an object to be carried is mounted, the front curled portions (the front connecting part) 104 which are connected with the rear curled portion (the rear connecting part) of one slat band chain link on the lower part of the front end of said top plate 102, and the rear curled portions 106 which are connected with the front curled portion of the other slat band chain link at the lower part of the rear end of said top plate.

The rear curled portions 106 are a pair of curved portions (downwardly curved plates) projecting symmetrically about the center line O—O of the slat band chain link 100 in the feeding direction. The front curled portions 104 consist of three projecting curled portions which fit with a pair of the rear curled portions 106 respectively.

The front and rear curled portions 104 and 106 are provided with holes 108 and 110 respectively for connecting pins. The front curled portions 104 fit with the rear curled portion 106 of the adjacent slat band chain link 100. The rear curled portions 106 fit with the front curled portions 104 of the other slat band chain link 100. The slat band chain links 100 are connected with each other sequentially and endlessly by means of a pin 112.

The resulting endless slat band chain is driven by means of a sprocket to convey objects to be carried on the top plate 102.

Compared with conventional slat band chains, the slat band chain according to the present invention has one more, namely, three front curled portions 14 and one more, namely, two rear curled portions 16. Therefore, the holding space of the pin 22 in the front curled portions 14 is shorter than that of the conventional one so the durability of the pin 22 against bending is improved and pin bending due to chain tension (load) of the slat band chain can be prevented.

SUMMARY OF THE INVENTION

The conventional slat band chains of this type were classified into special chains for the straight lines and special chains for lines including curved lines.

The operation of conventional slat band chains will be described with reference to an example having the chain pitch A (the space between the center of the front curled portions and that of the rear curled portions) set to 38.1 mm, which is most widely used. In the case of the chain for a straight line, the pins 112 inserted in the front and rear curled portions 104 and 106 do not incline, and the length of those curled portions can be made relatively shorter than that of the curled portions of chains for a curved line. To shorten the distance between the adjacent chain links, in the case of a

2 chain for a straight line, the length C of the rear curled portions on the sprocket in the feeding direction (the length of the chain link in mesh with the sprocket) is set to 12.6–13.0 mm (standard length: 12.7 mm). However, in the case of chains for a curved line, as shown in FIG. 6, it is necessary to enlarge the diameter of said hole 110 so that the pin 112 can incline in the hole when the chain passes a curve. Therefore, the length C of the rear curled portion 106 of the chain link in the feeding direction is longer than that of the chain for a straight line. Usually, the length C is 14.7–15.3 mm (standard length: 15.2 mm).

The application of a hole 110 of the same diameter for a chain for curved lines in spite of the inclination of the pin 112 in the hole 110 can be achieved by the adoption of a pin 112 of the smaller diameter. However, the strength of the chain cannot be guaranteed by using such a pin. In the past, it was necessary to manufacture two kinds of slat band chains having different sizes for straight and curved lines. Therefore, two kinds of sprockets were also necessary for two different slat band chains for straight and curved lines.

In addition, recently, steel slat band chains and sprockets have been replaced by synthetic resin ones, because the latter have such merits as being lighter in weight, lower in power consumption and smoother in conveying objects to be carried on the top plate.

As shown in FIG. 7(A), odd teeth have been adopted for the sprocket 114 and the chain is engaged with the sprocket at every other tooth to reduce wear of the teeth.

In the case of a chain for a straight line, when said chain pitch A is 38.1 mm, as described above, the length C of the rear curled portions 106 in the feeding direction is 12.6–13.0 mm, so odd teeth (for example, 25, 23, 21 etc.) can be adopted for the rear curled portions 106. However, in the case of a chain for a curved line, the length C of this chain link can be as long as 14.7–15.3 mm, so the addendum dimension 118 between the teeth becomes as short as about 1 mm, so it was practically impossible to manufacture a synthetic resin sprocket with any durability. Therefore, in the case of a synthetic resin sprocket, the every other tooth engagement system was not employed but instead the every tooth engagement system (the system to engage the chain with every tooth of the sprocket 116) as shown in FIG. 7(B) was used.

However, as described above, the synthetic resin sprocket has many merits over the steel sprocket, so it is very inconvenient that the steel sprocket alone can be used for a curved line.

The purpose of the present invention is to solve this problem and to provide a slat band chain which can be used not only for the straight lines but also for curved lines, instead of the conventional separate slat band chains for the straight and curved lines respectively, and a synthetic resin sprocket which can engage with every other tooth of the chain.

To achieve the above purpose, the present invention is characterized by the installation of at least three reinforcement ribs connecting the front curled portions with the rear curled portions in the structure comprising the top plate on which an object to be carried is mounted, a pair of the rear curled portions which are connected with the front curled portions of another slat band chain link at the lower part of the rear end of said top plate, and three projecting front curled portions which fit with the rear curled portions of a slat band chain link at the lower part of the front end of said top plate.

The reinforcement ribs can take any shape, for example, straight or curved, if they can connect three front curled portions with two rear curled portions. Moreover, such ribs may have Y-shape forked portions at one or both ends.

To use the present invention for both straight and curved lines, for slat band chain links having a chain pitch of about 38.1 mm or less, the width of said pair of the rear curled portion (the space between the outside end of the one rear curled portion and that of the other rear curled portion) is set to 30–45 mm and the length of the rear curled portions in the feeding direction is set to 13.3–14.5 mm.

The reason why the width of the rear curled portions is set to 30 mm or more is that if the width is shorter than this value, the service life of the sprocket is adversely affected. The reason why the width is set to 45 mm or less is that the underface of the top plate wears faster because of the resulting broader width of the front curled portions connecting with the rear curled portions and the resulting narrower rail engagement width of the slat band.

The reason why the length of the rear curled portions in the feeding direction is set to 13.3 mm or more is that it is the lowermost value in view of the chain strength when the pin inclines in the rear curled portions. The reason why the length is set to 14.5 mm or less is that the service life of the synthetic resin sprocket is not adversely affected by this setting.

The length of the rear curled portions in the feeding direction may be expressed not only by the actual numerical value but also by its ratio to the chain pitch. In this case, the former may be 0.78–1.20 and the latter may be 0.35–0.38.

In addition, such length may be expressed by the length of the sprocket which is engaged with each slat band chain link mentioned above.

If slat band chain links having the above configuration are connected with each other sequentially to form an endless chain, the resulting chain has higher strength compared with the conventional chains and 30% or higher allowable load, compared with a chain made of the same material.

Since the conventional separate slat band chains for straight and curved lines can be replaced by one chain of the present invention, the manufacture and control of the chain becomes simpler. Only one kind of sprocket is enough for such a chain.

Moreover, since the length of the slat band chain link in the feeding direction is shorter than that of the conventional slat band chain link for a curved line, the chain can be engaged with every other tooth of the plastic sprocket.

BRIEF DESCRIPTION OF THE DRAWINGS

This above-mentioned and other objects, features and advantages of the present invention will become more apparent from the following description of the preferred embodiments of the present invention with reference to the drawings, wherein.

DETAILED DESCRIPTION OF THE PREFERRED EMBODIMENTS

The preferable embodiment will be described below with reference to the accompanying drawings.

Figure 1:
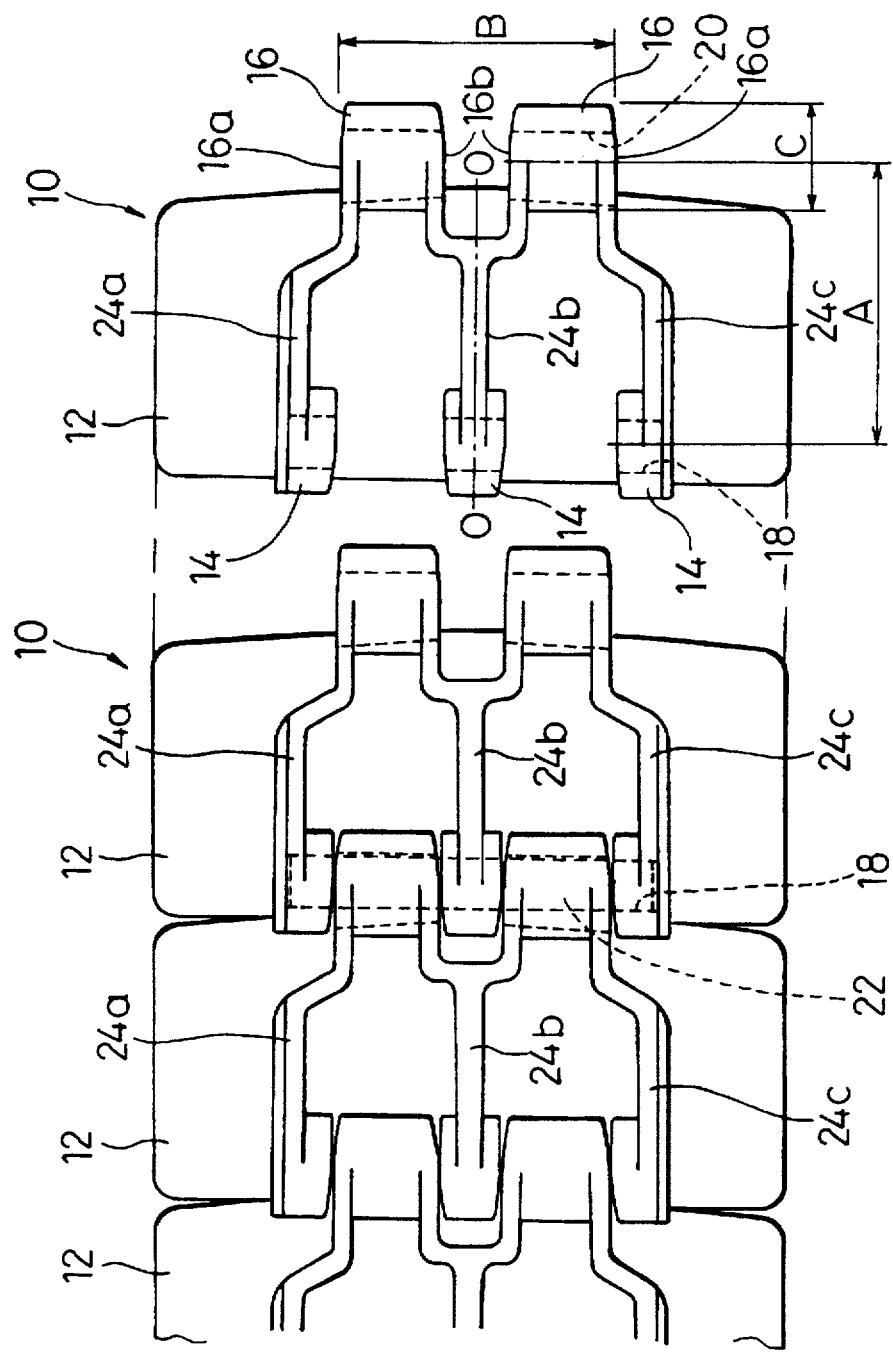
FIG. 1 is a bottom view of one embodiment of the slat band chain of the present invention.
Figure 2:
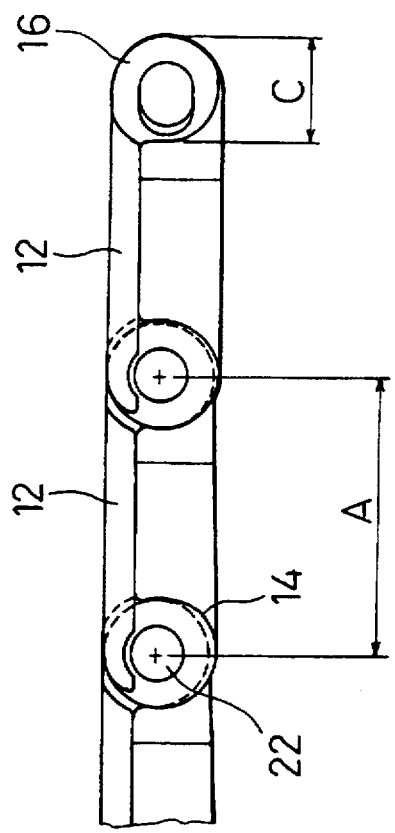
FIG. 2 is a side view of the slat band chain shown in FIG. 1.
Figure 3:
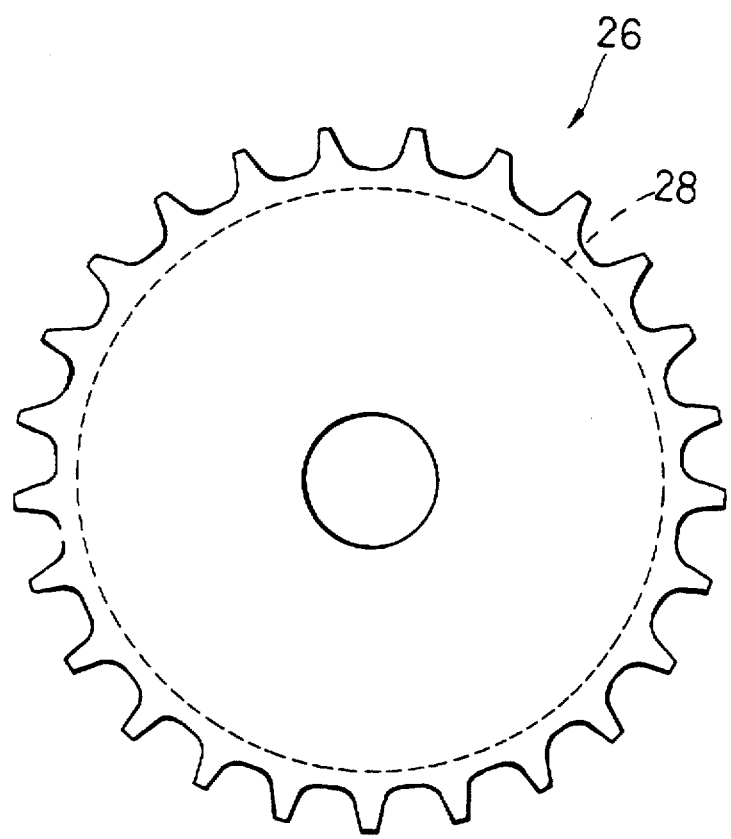
FIG. 3 is a front view of one embodiment of the sprocket of the present invention.
Figure 4:
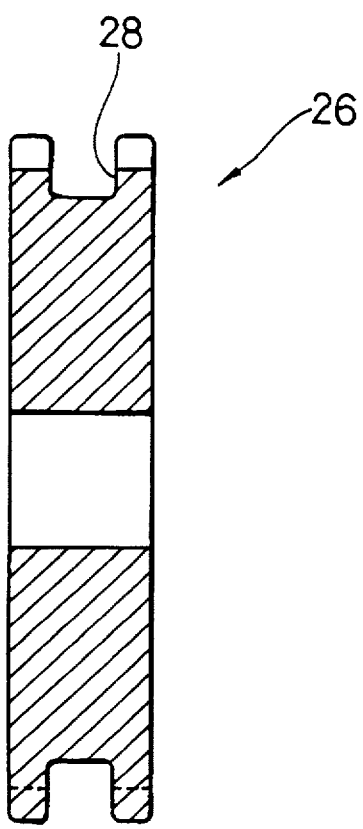
FIG. 4 is a longitudinal cross-sectional view of the sprocket shown in FIG. 3.
Figure 5:
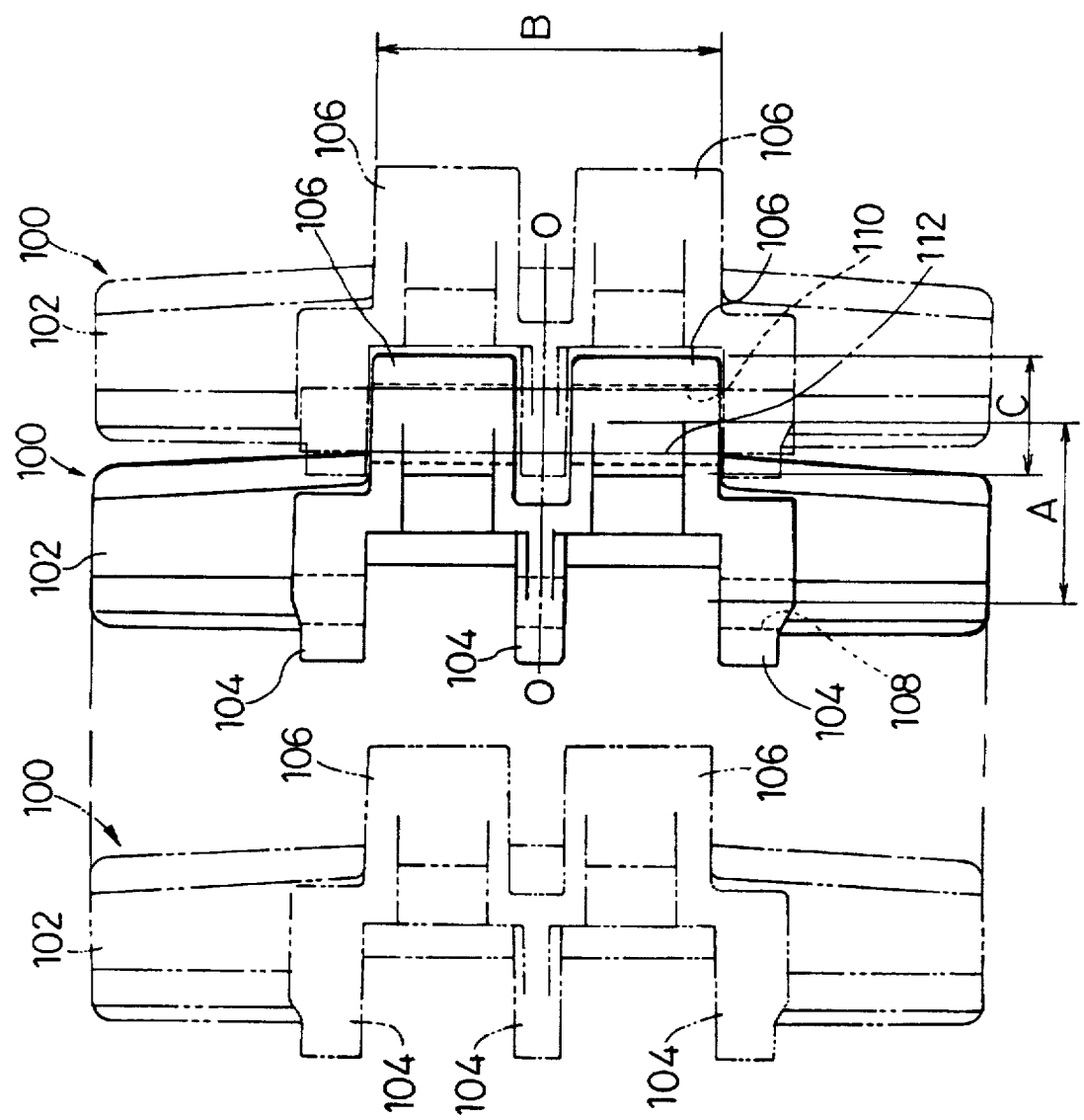
FIG. 5 is a bottom view of one embodiment of the conventional slat band chain.
Figure 6:
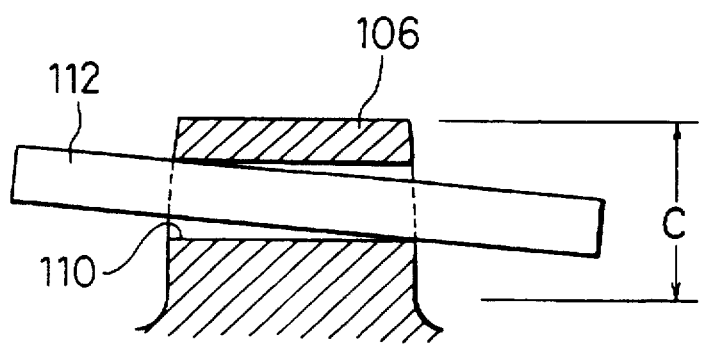
FIG. 6 is an explanatory drawing showing the relationship between the holes and the pins.
Figure 7A:
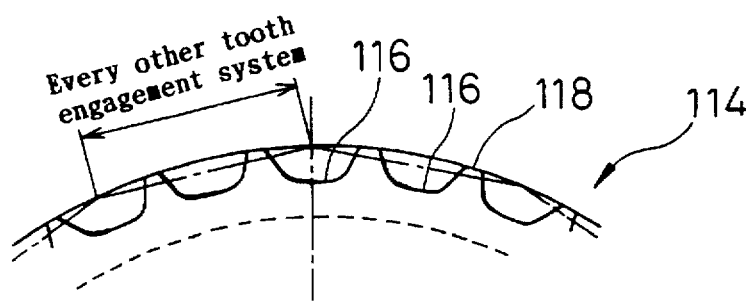
FIG. 7(A) is an explanatory drawing showing every other tooth engagement between the chain and the sprocket.
Figure 7B:
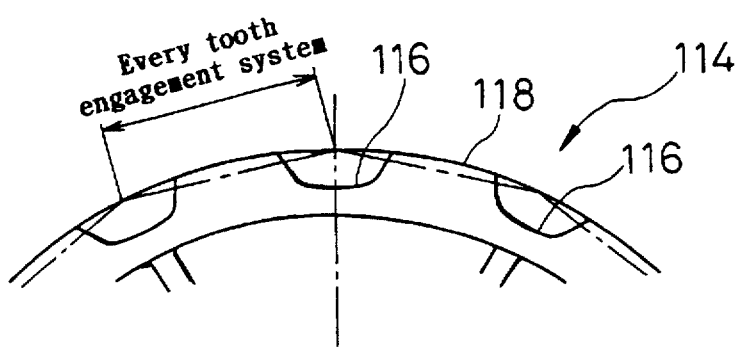
FIG. 7(B) is an explanatory view showing every tooth engagement between the chain and the sprocket.

FIG. 1 shows the bottom view of one embodiment of the present invention. FIG. 2 shows its side view. FIG. 3 shows the front view of one embodiment of the sprocket of the present invention. FIG. 4 shows its longitudinal cross-sectional view. In these drawings, the numeral 10 indicates the slat band chain link. The slat band chain 10 comprises the top plate 12 on which an object to be carried is mounted, the front curled portions 14 which are connected with the rear curled portions of one slat band chain link 10 at the lower part of the front end of said top plate 12, and the rear curled portions 16 which are connected with the front curled portions of the other slat band chain link at the lower part of the rear end of said top plate.

The rear curled portions 16 are a pair of projecting curved parts symmetrical about the center line 0—0 of the slat band chain in the feeding direction. The front connecting part 14 consists of three projecting curled portions which fit with a pair of the rear curled portions 16.

The front and rear curled portions 14 and 16 are provided with holes 18 and 20 for the connecting pins. The front curled portions 14 fit with the rear curled portions 16 of the adjacent slat band chain link 10. The rear curled portions 16 fit with the front curled portion 14 of the other slat band chain link 10. The slat band chain links 10 are connected with each other sequentially to form an endless chain. This configuration is the same as that of the conventional chain mentioned above (Published Unexamined Utility Model Application No. 4-138012).

24a–24c indicate three reinforcement ribs connecting the front curled portions 14 with the rear curled portions 16. These ribs improve the strength of the chain itself, and at the same time the ribs 24a and 24c are used to bring the chain into contact with the rail sides when the chain passes a curve. The central rib 24b enters the groove 28 at the center of the sprocket 26 to prevent the chain from lateral movement.

The only role of these reinforcement ribs 24a–24c is to connect the front curled portions with the rear curled portions. As is clearly seen in the figure, these ribs consist of two ribs 24a and 24c which connect each of the front curled portions 14 on both ends with the outside end 16a of each of the rear curled portions 16 and one central rib 24b which connects the central front curled portion 14 with the inside end 16b of each of the rear curled portions 16. The central rib 24b has Y-shape forked portion at one end. Such rib may straddle two or more front curled portions, while four or more ribs may be used.

In the case of the slat band chain link 10 having a chain pitch of 38.1 mm or less, the width B of the rear curled portions is greater than that of the conventional chain for a straight line, namely, 30–45 mm. The length C of the rear curled portions in the feeding direction is set to 13.3–14.5 mm, the intermediate value of the widths of the chains for straight and curved lines.

The width B of the rear curled portions and the length C of the rear curled portions in the feeding direction may be expressed not only by the actual numerical value but also by their ratio to the chain pitch A. In this case, if the chain pitch A is 1, the width B is 0.78–1.20 (for example, when the chain pitch is 38.1 mm, the width B is 29.7–45.72 mm, when 37.5 mm, it is 29.25–45.0 mm, when 38.5 mm, it is 30.03–46.2 mm). The length C in the feeding direction is 0.35–0.38 (for example, when the chain pitch is 38.1 mm, the length C is 13.33–14.48 mm, when 37.5 mm, it is 13.13–14.25 mm, and when 38.5 mm, it is 13.48–14.63 mm).

A slat band chain link 10 having the above configuration is engaged with and driven by the sprocket 26 shown in FIGS. 3 and 4 to convey the objects to be carried on the top plate 12.

In the case of the present embodiment, three reinforcement ribs 24a–24c are installed to connect the front curled portions 14 with the end curled portions 16, so the strength of the slat band chain link 10 is improved. As a result, compared with the conventional slat band chain, the strength of the slat band chain of the present invention is enhanced and as compared with a slat bad chain made of the same material, the allowable load increases. It becomes possible to manufacture a transport conveyor longer than the conventional synthetic resin slat band chain.

One slat band chain can be used for both straight and curved lines, the chain can be economically manufactured by one production process. In addition, the chain of the present invention has the merit that it requires only one type of sprocket.

When an endless chain is made by connecting slat band chain links 10 with each other sequentially, it is desirable to make the gap between the chain link 10 as narrow as possible. In the case of the slat band chain of the present invention, especially that for a curved line, the length C of the curled portions in the feeding direction is short, so the curled tip of the top plate 12 can overlap another curled tip of the adjacent slat band chain link. As a result, the chain of the present invention has the merit of having achieved a shorter chain gap.

In addition, the ratio of the width B of said rear curled portions to the chain pitch A is 0.78–1.20, so the support width of the rail for the slat band is reasonably maintained, and the faster wear of the underface of the top plate 12 can be prevented. The ratio of the width C of said rear curled portions to the chain pitch A is 0.35–0.38, so the strength of the chain can be maintained and the service life of the sprocket is not adversely affected.

Therefore, even a sprocket made of synthetic resin has a short length C of the rear curled portions in the feeding direction, so it has such merits as sufficient strength and also of being engaged with every other tooth of the sprocket.

An experiment was conducted to compare the strength of the slat band chain of the present invention with that of the conventional one (comprising one rear curled portion, two projecting front curled portions which fit with said rear curled portions, one or two rib(s) connecting the front curled portion with the rear curled portion, that is, the embodiment of the present invention shown in FIG. 1 having the reinforcement ribs 24a and 24c on both sides without the central reinforcement rib 24b). In this experiment, the slat band chain was made entirely of synthetic resin (having all synthetic-resin-made top plate, rear curled portions, front curled portions, pins etc.)

As a result, it was found that the breaking load of the conventional slat band chain was 270–350 kgf, but that of the present invention was 470–550 kgf with at least 30% increase. Such a marked increase of the breaking load may be due to the shorter pin holding space in the two rear curled portions and the three projecting front curled portions which fit with said rear curled portions, three or more reinforcement ribs connecting the front curled portions with the rear curled portions, and the width of a pair of the rear curled portions and the length of the rear curled portions in the feeding direction having the intermediate value of conventional chains for both straight and curved lines, namely , 30–45 mm and 13.3–14.5 mm respectively.

As described above, compared with the conventional slat band chain, the present invention has such merits as higher breaking strength and improved fatigue strength due to three or more ribs connecting the front curled portions with the rear curled portions on the rear side of the top plate.

In addition, the slat band chain of the present invention shows lower face pressure and less elongation wear due to the rear curled portions being larger than that of the conventional slat band chain. As a result, even a slat band chain made of synthetic resin has sufficient strength for various applications.

The length of the curled portions in the feeding direction having the intermediate value of those of the chains for straight and curved lines makes it possible to achieve narrower chain gaps. As a result, only one type of chain instead of two types of chain is sufficient for straight and curved lines.

In addition, since only one type of the slat band chain of the present invention will do for both straight and curved lines, so only one type of the slat band chain is sufficient for the purpose. Moreover, because of the shorter length of the rear curled portions in the feeding direction, it is possible for the chain to be engaged with every other tooth of a sprocket made of synthetic resin.

While the present invention has been described in terms of several preferred embodiments, those of skill in the art will recognize that the present invention can be practiced with modifications without departing from the spirit and scope of the appended claims.

What is claimed is:

1. A synthetic resin slat band chain having a standard chain pitch of about 38.1 mm and comprising a synthetic resin top plate on which an object to be carried is mounted, a first synthetic resin slat band chain link having a front curled portion and a pair of rear curled portions which are connected with a front curled portion at a front end of a second synthetic resin slat band chain link at a lower part of a rear end of said top plate, and each link having at least three synthetic resin reinforcement ribs connecting said front curled portions with said rear curled portions, said rear curled portions each having a hole sized to receive a synthetic resin pin for connecting said rear portions of the first slat band chain link with said front curled portion of the second slat band chain link, and wherein the width of said pair of rear curled portions is 30–45 mm and the length of said rear curled portions is 13.3–14.5 mm, for providing increased breaking load capability of the slat band chain, and wherein the slat band chain is operable to travel along both a straight line path and a curved line path.

2. A slat band chain as set forth in claim 1, wherein the ratio of the width of said rear curled portions to the chain pitch is 0.78–1.20 and the ratio of the length of said rear curled portions to the chain pitch is 0.35–0.38.

3. A conveyor system comprising a synthetic resin slat band chain adapted to be supported upon and between a pair of guide rails, the chain having a standard chain pitch of about 38.1 mm comprising a synthetic resin top plate on which an object to be carried is mounted, a first synthetic resin slat band chain link having a front curled portion and a pair of rear curled portions which are connected with a front curled portion at a front end of a second synthetic resin slat band chain link of a lower part of a rear end of said top plate, and each link having at least three synthetic resin reinforcement ribs connecting said front curled portions with said rear curled portions, said rear curled portions each having a hole sized to receive a synthetic resin pin for connecting said rear portions of the first slat band chain link with the front curled portion of the second slat band chain link, and wherein the width of said pair of rear curled portions is 30–45 mm and the length of said rear curled portions is 13.3–14.5 mm, for providing increased braking load capability of the slat band chain, and wherein the slat band chain is operable to travel along both a straight line path and a curve line path; and a sprocket in engaging relation to the slat band chain, the sprocket comprising a circular synthetic resin disk having an aperture at the center thereof, and having a plurality of spaced notches at the edges thereof defining a plurality of engaging teeth that are operable to engage the slat band chain at every other tooth for the reduction of wear in the teeth of the sprocket.

4. The conveyor system of claim 3, wherein the sprocket is formed with a central groove about the periphery thereof and one of the reinforcing ribs is constantly engageable in the groove to prevent lateral movement of the chain.

5. A slat band chain as set forth in claim 1, wherein at least two of the reinforcing ribs are engageable with the rails to guide the chain along both the straight line path and curved line path.

* * * * *